(12) United States Patent
Nielsen et al.

(10) Patent No.: US 8,131,818 B2
(45) Date of Patent: Mar. 6, 2012

(54) OPTIMIZING CACHING PERIOD OF LOCATION DATA FOR NETWORK BASED LOCATION SERVICES

(75) Inventors: Mark D. Nielsen, Austin, TX (US); Sri Ramanathan, Lutz, FL (US); Matthew A. Terry, Dunwoody, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 12/629,539

(22) Filed: Dec. 2, 2009

(65) Prior Publication Data
US 2011/0131197 A1 Jun. 2, 2011

(51) Int. Cl.
*G06F 17/30* (2006.01)
*G06N 5/02* (2006.01)

(52) U.S. Cl. ..... 709/217; 709/218; 709/219; 455/456.1; 455/456.2

(58) Field of Classification Search .................. 709/217, 709/218, 219; 455/456.1–456.6; 340/425.5, 340/426.18, 426.2, 426.21, 426.22; 701/200, 701/210, 213–216
See application file for complete search history.

(56) References Cited

U.S. PATENT DOCUMENTS

| | | | |
|---|---|---|---|
| 7,277,714 | B1 | 10/2007 | Mikan et al. |
| 7,346,360 | B1 | 3/2008 | Mikan et al. |
| 7,532,897 | B2 * | 5/2009 | Mikan et al. ............... 455/456.1 |
| 2002/0193121 | A1 | 12/2002 | Nowak et al. |
| 2003/0023726 | A1 * | 1/2003 | Rice et al. ..................... 709/225 |
| 2003/0101225 | A1 * | 5/2003 | Han et al. ..................... 709/206 |
| 2008/0090589 | A1 | 4/2008 | Mikan et al. |
| 2009/0063038 | A1 | 3/2009 | Shrivathsan et al. |
| 2009/0097414 | A1 | 4/2009 | Yoon et al. |

FOREIGN PATENT DOCUMENTS
WO 00/05825 A2 2/2000

OTHER PUBLICATIONS

International Search Report for PCT/EP2010/067102 Mailed Feb. 14, 2011.
Prabuddha Biswas et al. "Location Caching in the Mobile Middleware Platform". Proceedings of the Third International Conference on Mobile Data Management (MDM '02). pp. 172-174. Year of Publication: 2002. ISBN: 0-7695-1500-2. Publisher: ACM.
Muthuswamy Vijayalakshmi et al. "Proactive location-based context aware services using agents". International Journal of Mobile Communications. vol. 7, Issue 2 (Feb. 2009). pp. 232-252. Year of Publication: 2009. ISSN:1470-949X. Publisher: Inderscience Publishers.

* cited by examiner

*Primary Examiner* — Wing Chan
*Assistant Examiner* — Ruolei Zong
(74) *Attorney, Agent, or Firm* — Schmeiser, Olsen & Watts; Anna Linne

(57) ABSTRACT

A system and associated method for optimizing caching period of location data for network based location services. A location caching server receives a location request from a mobile device. The location caching server calculates, pursuant to a predefined calculation rule, a caching period of a location cache entry for the mobile device based on a precision level requested by the mobile device and a service precision level assigned for a type of location service for which the location request was made. The location caching server obtains real location data of the mobile device of the calculated caching period is expired. The location caching server subsequently adjusts the caching period based on a distance traveled by the mobile device pursuant to a predefined adjustment rule, and updates the location cache entry.

20 Claims, 9 Drawing Sheets

| INITIAL CACHE DEFAULT ||
|---|---|
| ServiceType | INITIAL CachePeriod (SECONDS) |
| Unknown | 20 |
| HIGH | 10 |
| MEDIUM | 30 |
| LOW | 60 |

FIG. 6A

| CALCULATION OF CACHING PERIOD $p$ BY REQUESTED PRECISION ||
|---|---|
| Precision | CALCULATED CachePeriod $p'$ |
| Unknown | $p$ |
| HIGH | $0.5p$ |
| MEDIUM | $p$ |
| LOW | $1.5p$ |

FIG. 6B

| ADJUSTMENT OF CACHING PERIOD $p'$ BY DISTANCE TRAVELED ||
|---|---|
| DISTANCE TRAVELED $d$ (METERS) | ADJUSTED CachePeriod $p''$ |
| $d$ = Zero (0) | $p'$ |
| $0 < d < 10$ | $0.8\,p'$ |
| $10 \leq d < 50$ | $0.65\,p'$ |
| $50 \leq d$ | $0.5\,p'$ |

FIG. 6C

|  | 1 | 2 | 3 |
|---|---|---|---|
| ServiceType (CachePeriod) | HIGH (10) | HIGH (10) | HIGH (10) |
| Precision | HIGH | LOW | HIGH |
| CachePeriod $P'$ | $P'=10\times0.5=5$ | $P'=10\times1.5=15$ | $P'=10\times0.5=5$ |
| TIME LAPSE | $6 > P'$ (CACHE EXPIRED) | $3 < P'$ (CACHE EFFECTIVE) | $6 > P'$ (CACHE EXPIRED) |
| LOCATION SOURCE | SERVER | CACHE | SERVER |
| TRAVELED DISTANCE | D=0 | D=25 | D=60 > 50 |
| CachePeriod $P''$ | $P''=10$ | NO ADJ $P''=10$ | $P''=5\times0.5=2.5$ |

FIG. 7A

|  | 4 | 5 | 6 |
|---|---|---|---|
| ServiceType (CachePeriod) | MEDIUM (30) | MEDIUM (15) | MEDIUM (15) |
| Precision | MEDIUM | LOW | LOW |
| CachePeriod $P'$ | $P'=30$ | $P'=15\times1.5=22.5$ | $P'=15\times1.5=22.5$ |
| TIME LAPSE | $40 > P'$ (CACHE EXPIRED) | $17 < P'$ (CACHE EFFECTIVE) | $25 > P'$ (CACHE EXPIRED) |
| LOCATION SOURCE | SERVER | CACHE | SERVER |
| TRAVELED DISTANCE | D=55 >50 | D=0 | D=0 |
| CachePeriod $P''$ | $P'=30\times0.5=15$ | NO ADJ $P''=15$ | $P''=30$ |

FIG. 7B

|  | 7 | 8 | 9 |
|---|---|---|---|
| ServiceType (CachePeriod) | LOW (60) | LOW (60) | LOW (48) |
| Precision | HIGH | HIGH | HIGH |
| CachePeriod $P'$ | $P'=60\times0.5=30$ | $P'=60\times0.5=30$ | $P'=48\times0.5=24$ |
| TIME LAPSE | $25 < P'$ (CACHE EFFECTIVE) | $33 > P'$ (CACHE EXPIRED) | $25 > P'$ (CACHE EXPIRED) |
| LOCATION SOURCE | CACHE | SERVER | SERVER |
| TRAVELED DISTANCE | D=5 | D=8 | D=0 |
| CachePeriod $P''$ | NO ADJ $P''=60$ | $P''=60\times0.8=48$ | $P''=60$ |

FIG. 7C

OPTIMIZING CACHING PERIOD OF LOCATION DATA FOR NETWORK BASED LOCATION SERVICES

BACKGROUND OF THE INVENTION

The present invention discloses a system and associated method for automatically optimizing caching period of location data for network based location services. Conventional network based location service methods caches the location data to overcome inaccuracy of the location data caused by latency for processing location requests and to support more transactions per a network location server. Conventional network based location service methods statically determine caching periods for various types of services without taking dynamic changes of circumstances into account, which degrades accuracy of the serviced location data.

BRIEF SUMMARY

According to one embodiment of the present invention, a method for optimizing caching period of location data for network based location services comprises: receiving a location request for a location service from a network location server, comprising parameters of MSISDN, Precision, TimeStamp, and ServiceType, wherein MSISDN is an identifier for a mobile device that has sent the location request to the network location server, wherein Precision is a precision level requested from the mobile device, wherein TimeStamp is a first time value when the network location server received the location request, wherein ServiceType is a service precision level that is assigned for the location service, and wherein ServiceType corresponds to a respective default caching period CachePeriod; determining that current location data of the mobile device needs to be obtained; obtaining the current location data from the network location server responsive to sending a real location query to the network location server; a processor of a computer adjusting CachePeriod corresponding to ServiceType based on a distance that the mobile device has traveled during a time lapse between the first time value TimeStamp and a second time value when the network location server received the real location query; and setting a new location cache entry to a location cache, the new location cache entry comprising parameters of MSISDN, NewServiceType, NewCachePeriod, PriorLocation, and PriorTimeStamp, wherein NewServiceType is selected from the group consisting of ServiceType and Precision, wherein NewCachePeriod is the adjusted CachePeriod, wherein PriorLocation is the obtained current location data, and wherein PriorTimeStamp is the second time value.

According to one embodiment of the present invention, a computer program product comprises a computer readable memory unit that embodies a computer readable program code. The computer readable program code contains instructions that, when run by a processor of a computer system, implement a method for optimizing caching period of location data for network based location services.

According to one embodiment of the present invention, a computer system comprises a processor and a computer readable memory unit coupled to the processor, wherein the computer readable memory unit containing instructions that, when run by the processor, implement a method for optimizing caching period of location data for network based location services.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for optimizing caching period of location data for network based location services.

BRIEF DESCRIPTION OF THE SEVERAL VIEWS OF THE DRAWINGS

FIGS. 6A, 6B and 6C illustrate a set of control parameters for optimizing caching period of location data for network based location services, in accordance with the embodiments of the present invention.

FIGS. 7A, 7B and 7C illustrate examples of location requests and optimized caching period resulting from the method for optimizing caching period of location data for network based location services of FIG. 3, in accordance with the embodiments of the present invention.

DETAILED DESCRIPTION

Figure 1:
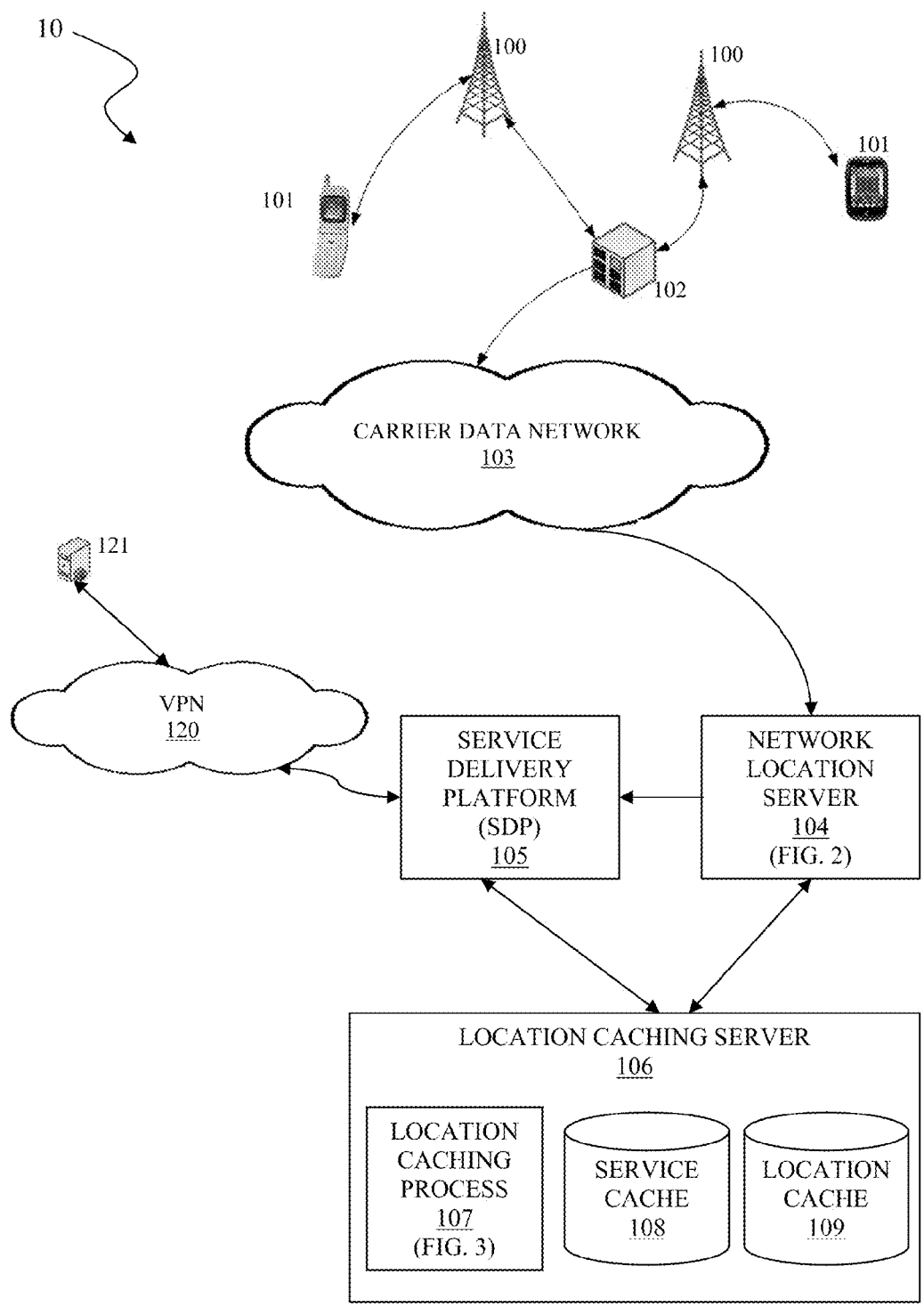
FIG. 1 illustrates a system for optimizing caching period of location data for network based location services, in accordance with embodiments of the present invention.

FIG. 1 illustrates a system 10 for optimizing caching period of location data for network based location services, in accordance with embodiments of the present invention.

The system 10 comprises a carrier and a third party. The carrier, also referred to as a service provider, comprises a carrier data network 103, a network location server 104, a service delivery platform (SDP) 105, and a location caching server 106. The third party comprises a virtual private network (VPN) 120 and a third party application server 121.

The carrier data network 103 interconnects a location based server 102, at least one base station, and at least one base mobile device, to the network location server 104. The carrier data network 103 provides data services to said at least one mobile device. The carrier data network 103 may be a wireless network, an Internet Protocol (IP) based network, or a combination thereof.

A mobile device 101 of said at least one base mobile device is a cellular terminal device that has positioning functionality. The mobile device may utilize an embedded Assisted Global Positioning System (GPS) processor to support more accurate network based location positioning.

A base station 100 of said at least one base station connects the mobile device 100 to the carrier data network 103 through the location based server 102. The base station 100 is commonly referred to as a cell tower, which supports wireless data and voice communication of multiple mobile devices within a coverage area referred to as a cell.

The location based server 102 determines a position coordinates associated with the mobile device 101 by use of predefined positioning technologies. Examples of positioning technologies may be, inter alia, cell tower identification, triangulation across multiple base stations. The cell tower identification is utilized for low level accuracy positioning. The triangulation is utilized for high level accuracy positioning.

The network location server 104 is a server platform that provides network based location services. The network location server 104 comprises various components performing service delivery platform functions such as determining location by use of various positioning technologies, processing location requests from mobile devices, throttling, billing, etc. The network location server 104 consolidates multiple location information from various location based servers 102 which may utilize different positioning technologies. The network location server 104 communicates consolidated location information and coordinates to the service delivery platform (SDP) 105 using various open application programming interfaces (APIs) such as Parlay X, OpenLS, and LIF/MLP. See description of FIG. 2, infra, for steps performed by the network location server 104.

The service delivery platform (SDP) 105 delivers location services offered by the carrier to the third party application server 121. The SDP 105 interacts with the network location server 104 and the location caching server 106 to obtain location information, either a current coordinates or a location cache entry for the mobile device 101. Examples of the location services may be, inter alia, group location service that provides location information for a group of mobile devices within a geographic area, specific location coordinates for a mobile device, geospatial mapping information for a device location, performing of a location aware application, etc.

The location caching server 106 provides caching services of location information and coordinates for the carrier. The location caching server 106 comprises a location caching process 107, a service cache 108, and a location cache 109. The service cache 108 comprises at least one service cache entry CacheDefault (ServiceType, CachePeriod), wherein ServiceType indicates a service precision level offered by the carrier, and wherein CachePeriod indicates a default caching period associated with the service precision level ServiceType. The default caching period CachePeriod is dynamically optimized by the location caching process 107. The location cache 109 comprises at least one location cache entry in a tuple (MSISDN, CacheDefault, PriorLocation, PriorTimeStamp). See description of FIG. 3, infra, for steps performed by the location caching process 107 and details of attributes the location cache entry.

The virtual private network (VPN) 120 is a secure Internet Protocol (IP) based network that connects the third party application server 121 to the service delivery platform (SDP) 105 for location services offered by the carrier. The third party application server 121 requests and consumes location information. Examples of third party application may be, inter alia, an enterprise Sales Force Automation system, an Application Service Provider application such as Google Maps, etc.

The system 10 improves accuracy of location information provided by the network location server 104 by use of the location caching server 106. End users on the side of the mobile device 101 or connected to the third party application server 121 perceive the location server as more accurate proportional to the precision level requested by the end users. The location caching process 107 dynamically and automatically determines when to use cached location data stored in the location cache 109 or when to queries the mobile device 101 for a real location, according to default caching period per service precision level, accuracy requested by the mobile device 101, and distance the mobile device 101 traveled.

The embodiments of the present invention may vary according to specifics of the location caching server 106 for non-functional requirements that are unrelated to caching functions such as number of subscribers, location throughput, latency requirements, etc. The location caching server 106 may utilize application server software to support scaling of the algorithms, process, and caches to meet the non-functional requirements. Examples of the application server software may be, inter alia, IBM® WebSphere® Application Server, Oracle® WebLogic, etc. (IBM and WebSphere are registered trademarks of International Business Machines Corporation in the United States; Oracle is a registered trademark of Oracle Corporation and/or its affiliates in the United States) The network location server 104 and the service delivery platform 105 may be integrated through common application program interfaces (APIs) or custom integration. Examples of the common APIs may be, inter alia, web services, OpenLS, LIF/MLP, etc. Examples of technology employed in the custom integration may be, inter alia, EJBs, SOAP, or Web Service interfaces. In embodiments in which a large number of location cache entries are required, the service cache 108 and the location cache 109 are implemented as a separate in-memory database such as TimesTen or SolidDB.

Figure 2:
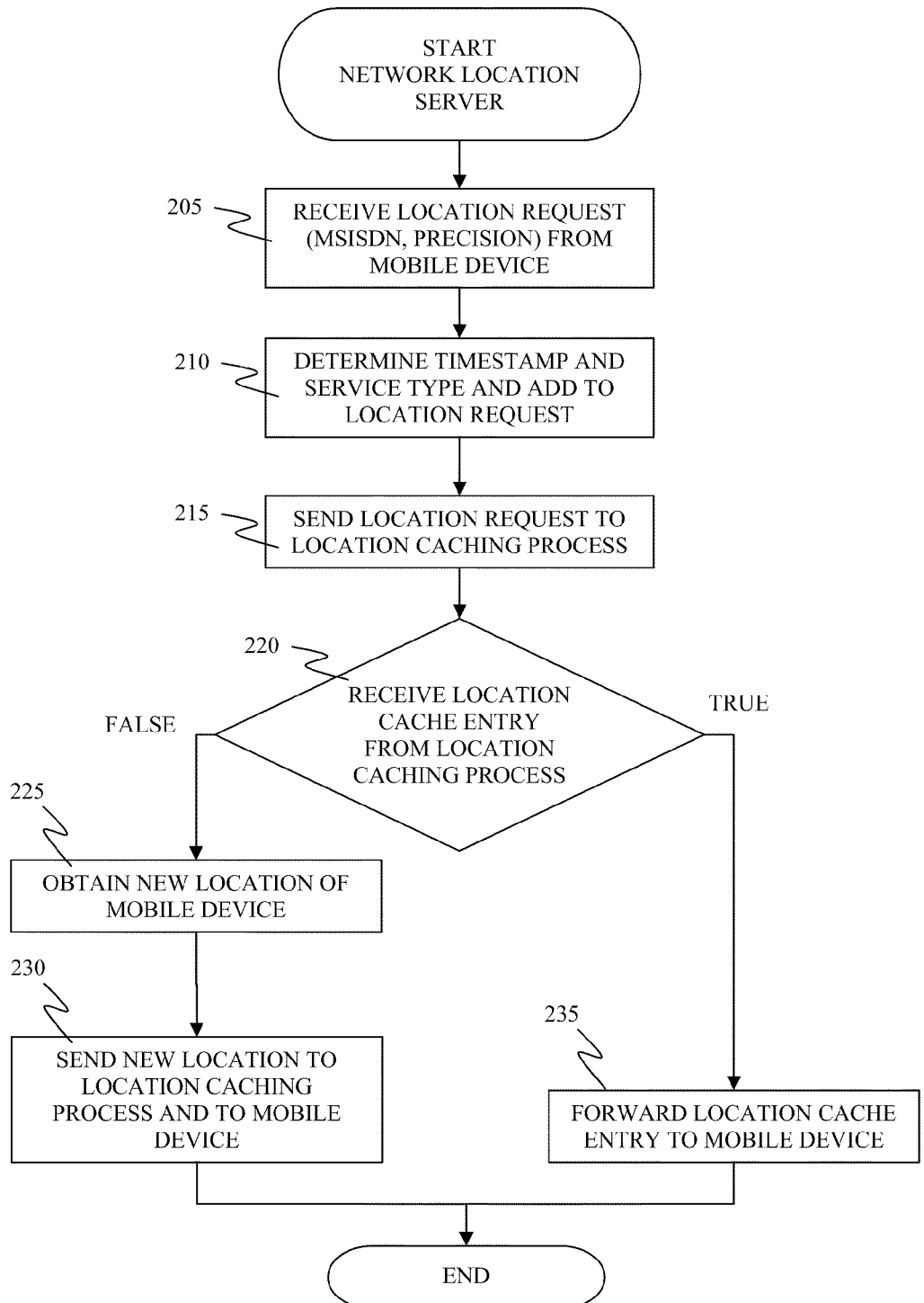
FIG. 2 is a flowchart depicting a method for optimizing caching period of location data for network based location services, as performed by a network location server of the system of FIG. 1, in accordance with the embodiments of the present invention.

FIG. 2 is a flowchart depicting a method for optimizing caching period of location data for network based location services, as performed by a network location server of the system of FIG. 1 supra, in accordance with the embodiments of the present invention.

In step 205, the network location server receives a location request (MSISDN, Precision) from a mobile device that requests location data, also referred to as a two-dimensional (XY) coordinate, of the mobile device. A first parameter MSISDN of the location request indicates a unique identifier of the mobile device from which the location request has originated. The term MSISDN is an acronym of Mobile Station Integrated Services Digital Network, which commonly refers to a Mobile Station ISDN Number, or a cell phone number in wireless communication. A second parameter Precision of the location request indicates a precision level requested by the mobile device. The location request is formatted pursuant to an industry standard definition employed in the system. Examples of industry standard definitions of the location request may be, inter alia, Parlay/X, LIF MLP, Open LS, etc. In one embodiment of the present invention, the second parameter Precision of the location request has the precision level selected from a set {HIGH, MEDIUM, LOW} according to precision levels of the Parlay/X standard definition. Then the network location server proceeds with step 210.

In step 210, the network location server determines a third parameter TimeStamp and a fourth parameter ServiceType and adds the parameters TimeStamp and ServiceType to the received location request. The third parameter TimeStamp is a timestamp that logs a point of time when the network location server has received the location request. The fourth parameter ServiceType is a service precision level of the network location server, which indicates accuracy of the location data serviced in response to the received location request. The service precision level of the fourth parameter ServiceType is determined by a type of service requested but independent from the precision level Precision requested by the mobile device in the location request. The network location server determines the fourth parameter ServiceType by use of domain and sub-domain names, bindings or coupling techniques. Then the network location server proceeds with step 215.

In one embodiment of the present invention, the fourth parameter ServiceType is selected from a set {UNKNOWN, HIGH, MEDIUM, LOW} for compatible operations with the second parameter PRECISION. If the service precision level is HIGH, the network location server provides highly accurate location data in response to the received location request. Thus a caching period associated with the service precision level ServiceType=HIGH is shorter than other service precision levels. Examples of services associated with HIGH service precision level may be, inter alia, navigation services, emergency call services, dispatching services, etc. If the service precision level is MEDIUM, the network location server provides moderately accurate location data in response to the received location request. Examples of services associated with HIGH service precision level may be, inter alia, location services such as finding friend, dating services, local shop search, phone book search, etc. If the service precision level is LOW, the network location server provides minimally accurate location data in response to the received location request. Thus a caching period associated with the service precision level ServiceType=LOW is the longest of all service precision levels. Examples of services associated with HIGH service precision level may be, inter alia, weather information service, traffic information service, local news, local sports team standings report, outdoor activity conditions report, etc. The service precision level UNKNOWN is a default value for any service precision level, which returns a moderate to highly accurate location data in response to the received location request. See FIG. 6A for an example of caching periods for respective service precision levels.

In step 215, the network location server sends the location request comprising four parameters (MSISDN, Precision, TimeStamp, ServiceType) to the location caching process. See description of step 300 of FIG. 3 infra for steps performed by the location caching process in response to step 215. Then the network location server proceeds with step 220.

In step 220, the network location server receives a response of the location request sent in step 215 from the location caching process and determines whether the location caching process has sent a location cache entry or a real location query to the network location server. If the network location server has received the real location query from the location caching process, in response to step 340 of FIG. 3 infra, then the network location server proceeds with step 225 to process the received real location query. If the network location server has received the location cache entry from the location caching process, in response to step 335 of FIG. 3 infra, then the network location server proceeds with step 235 to process the received location cache entry.

In step 225, the network location server obtains a new location data of the mobile device by performing a real location query across the carrier data network. Then the network location server proceeds with step 230.

In step 230, the network location server sends the new location data to the location caching process for an update of a location cache entry associated with the location request and to the mobile device as a response to the location request. Then the network location server terminates processing the location request.

In step 235, the network location server forwards the received location cache entry to the mobile device as a response to the location request. In steps 230 and 235, the network location server captures billing and usage information based on services rendered to the mobile device. Then the network location server terminates processing the location request.

Figure 3:
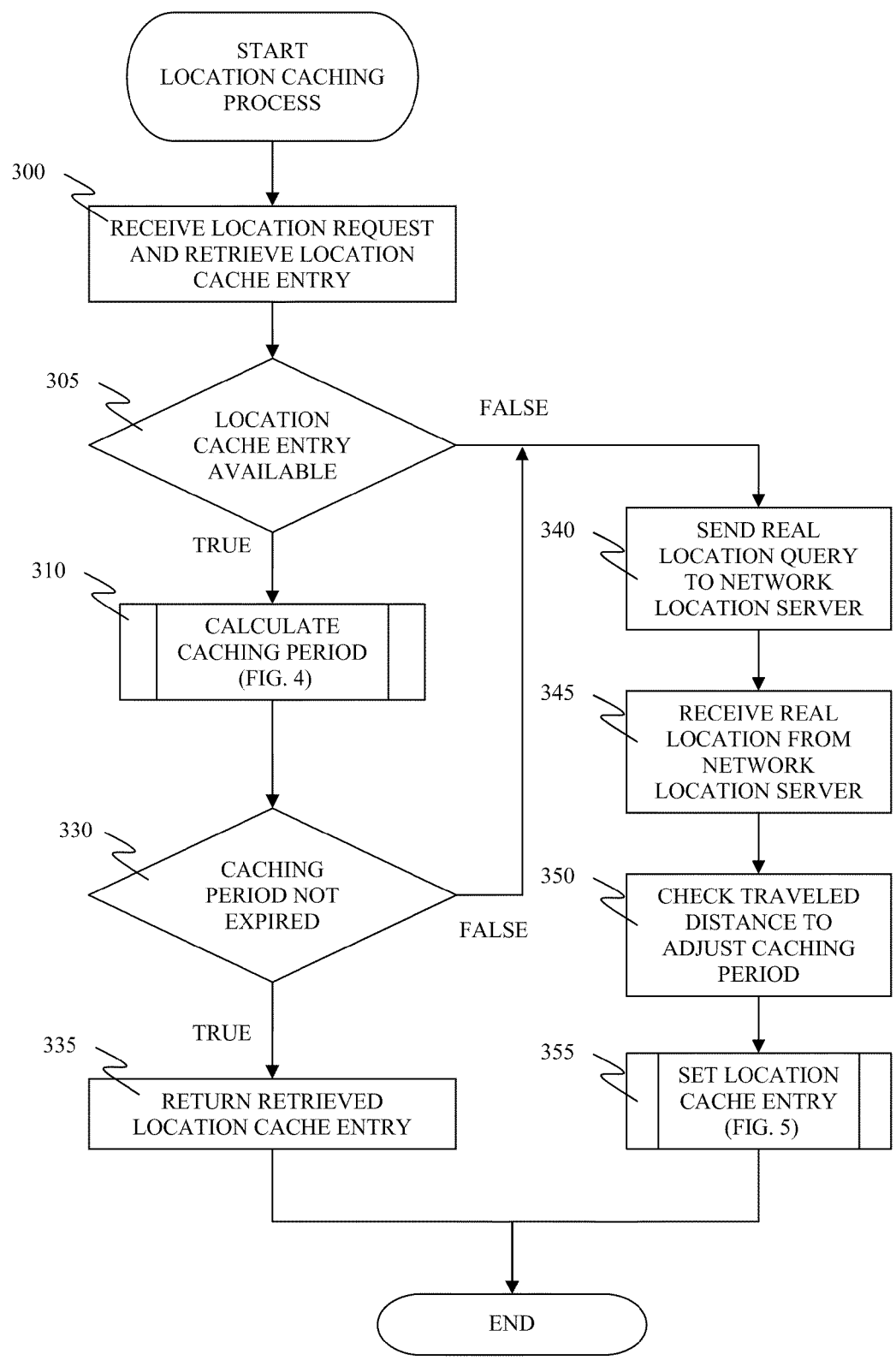
FIG. 3 is a flowchart depicting a method for optimizing caching period of location data for network based location services, as performed by a location caching process of the system of FIG. 1, in accordance with the embodiments of the present invention.

FIG. 3 is a flowchart depicting a method for optimizing caching period of location data for network based location services, as performed by a location caching process of the system of FIG. 1 supra, in accordance with the embodiments of the present invention.

In step 300, the location caching process receives the location request (MSISDN, Precision, TimeStamp, ServiceType) from the network location server, in response to step 215 of FIG. 2 supra. The location caching process subsequently retrieves a location cache entry that corresponds to the first parameter MSISDN of the received location request by searching the location cache with MSISDN. The location cache entry comprises (MSISDN, CacheDefault, PriorLocation, PriorTimeStamp). A first attribute MSISDN indicates a unique identifier of the location cache entry, which matches to the first parameter MSISDN of the location request. A second attribute CacheDefault indicates cache default information stored in a respective service cache entry comprising a service precision level and a caching period associated with the service precision level (ServiceType, CachePeriod). The caching period associated with the service precision level CachePeriod is subject to reset. A third attribute PriorLocation indicates a location data sampled in a most recent location request. A fourth attribute PriorTimeStamp indicates a timestamp when the most recent location request was made. Then the location caching process proceeds with step 305.

In step 305, the location caching process determines whether a location cache entry that corresponds to the received location request is available by searching the location cache with the first parameter MSISDN. If the location caching process determines that the location cache entry corresponding to the received location request is available, then the location caching process proceeds with step 310. If the location caching process determines that the location cache entry corresponding to the received location request is not available, then the location caching process proceeds with step 340.

In step 310, the location caching process calculates a caching period of the retrieved location cache entry. See descriptions of FIG. 4 infra for detailed steps of step 310. Then the location caching process proceeds with step 330.

In step 330, the location caching process determines whether the caching period has already expired by adding the caching period CachePeriod of the cache default to a time value of PriorTimeStamp and subsequently comparing the added result with a time value of TimeStamp. If the added result is less than the time value of TimeStamp, then the caching period has expired since the latest caching. If the added result is greater than or equal to the time value of TimeStamp, then the caching period is not expired yet, and consequently the location cache entry is still effective. If the location caching process determines that the caching period has already expired, then the location caching process proceeds with step 340. If the location caching process determines that the caching period has not expired yet, then the location caching process proceeds with step 335.

In step 335, the location caching process returns the location cache entry from step 305 to the network location server. Then the location caching process terminates.

In step 340, the location caching process sends a real location query to network location server, because the location caching process do not have an unexpired location cache entry for the location request. See description of step 220 of FIG. 2 supra for steps performed by the network location server in response to the real location query. Then the location caching process proceeds with step 345.

In step 345, the location caching process receives a result of the real location query from the network location server, in response to step 230 of FIG. 2 supra. The result of the real location query comprises (MSISDN, CacheDefault, PriorLocation, PriorTimeStamp), wherein CacheDefault comprises (ServiceType, CachePeriod). Then the location caching process proceeds with step 350.

In step 350 the location caching process adjusts the caching period by examining a distance that the mobile device has traveled since the most recent location request. Then the location caching process proceeds with step 355.

In one embodiment of the present invention, the adjusted caching period is calculated according to various ranges of distance that the mobile device has traveled. See descriptions of FIG. 6C infra for an example of distance ranges to the caching period.

In step 355, the location caching process updates the location cache entry corresponding to the location request with the new location from step 345. See descriptions of FIG. 5 infra for detailed steps of step 355.

Figure 4:
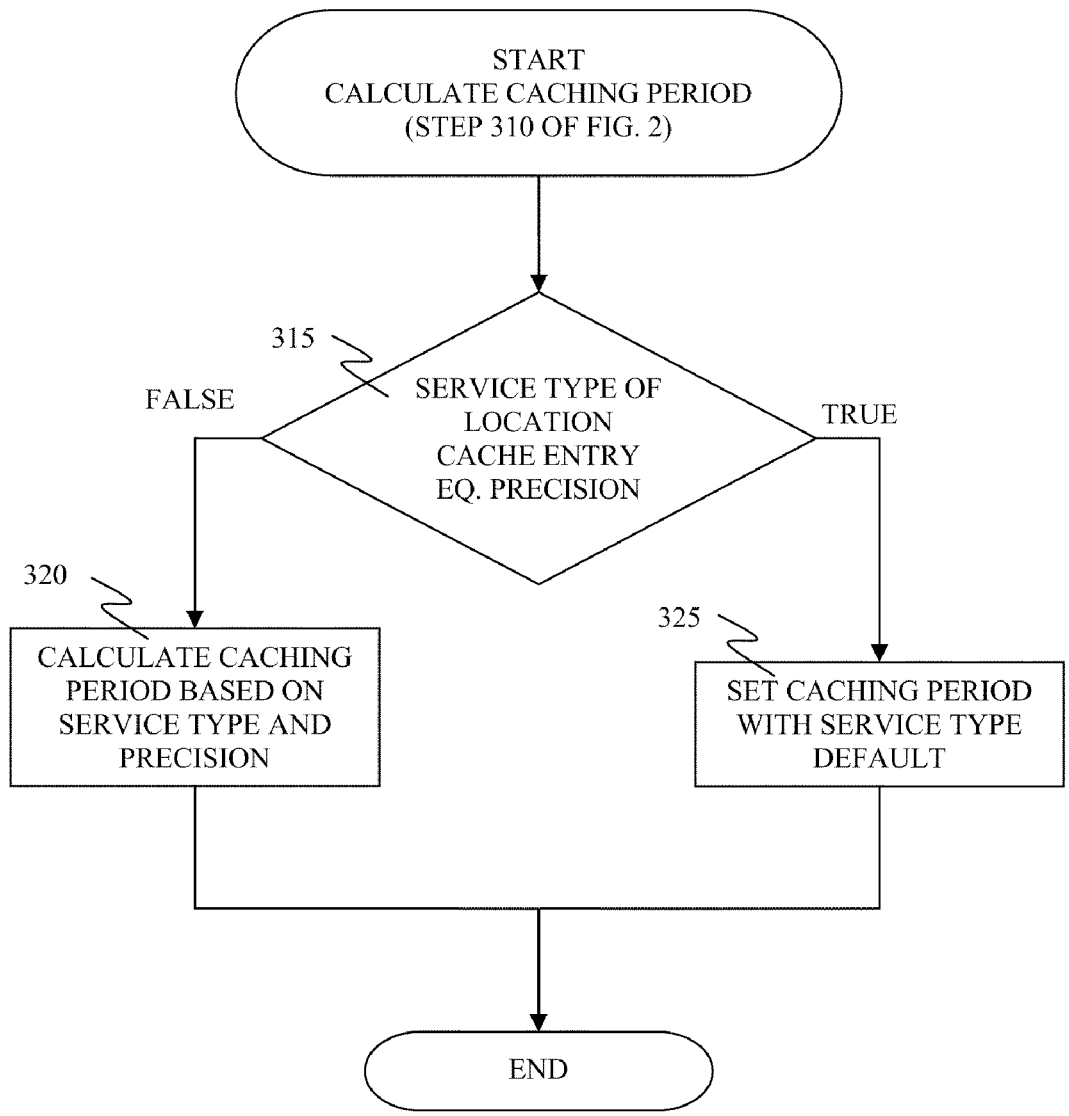
FIG. 4 is a flowchart depicting a method for calculating caching interval to optimize caching period of location data, as performed by a location caching process of the system of FIG. 1, in accordance with the embodiments of the present invention.

FIG. 4 is a flowchart depicting a method for calculating caching interval to optimize caching period of location data, as performed by a location caching process of the system of FIG. 1 supra, in accordance with the embodiments of the present invention.

In step 315, the location caching process determines whether the service precision level ServiceType of the retrieved location cache entry is equal to the requested precision level Precision of the location request. If the location caching process determines that the service precision level ServiceType of the location cache entry is not equal to the requested precision level Precision of the location request, then the location caching process proceeds with step 320. If the location caching process determines that the service precision level ServiceType of the location cache entry is equal to the requested precision level Precision of the location request, then the location caching process proceeds with step 325.

In step 320, the location caching process calculates the caching period by use of the cache default information CacheDefault (ServiceType, CachePeriod) and the requested precision level Precision of the location request according to a caching period calculation rule. The caching period calculation rule is devised to resolve caching period discrepancy between the service precision level ServiceType provided by the network location server and the precision level Precision specified in the location request. Then the location caching process proceeds with step 330 of FIG. 3 supra.

In one embodiment of the present invention, the caching period calculation rule is defined according to the precision level Precision of the location request. See descriptions of FIG. 6B infra for an example of the caching period calculation rule.

In step 325, the location caching process sets the caching period with the default caching period CachePeriod for ServiceType. Then the location caching process proceeds with step 330 of FIG. 3 supra.

Figure 5:
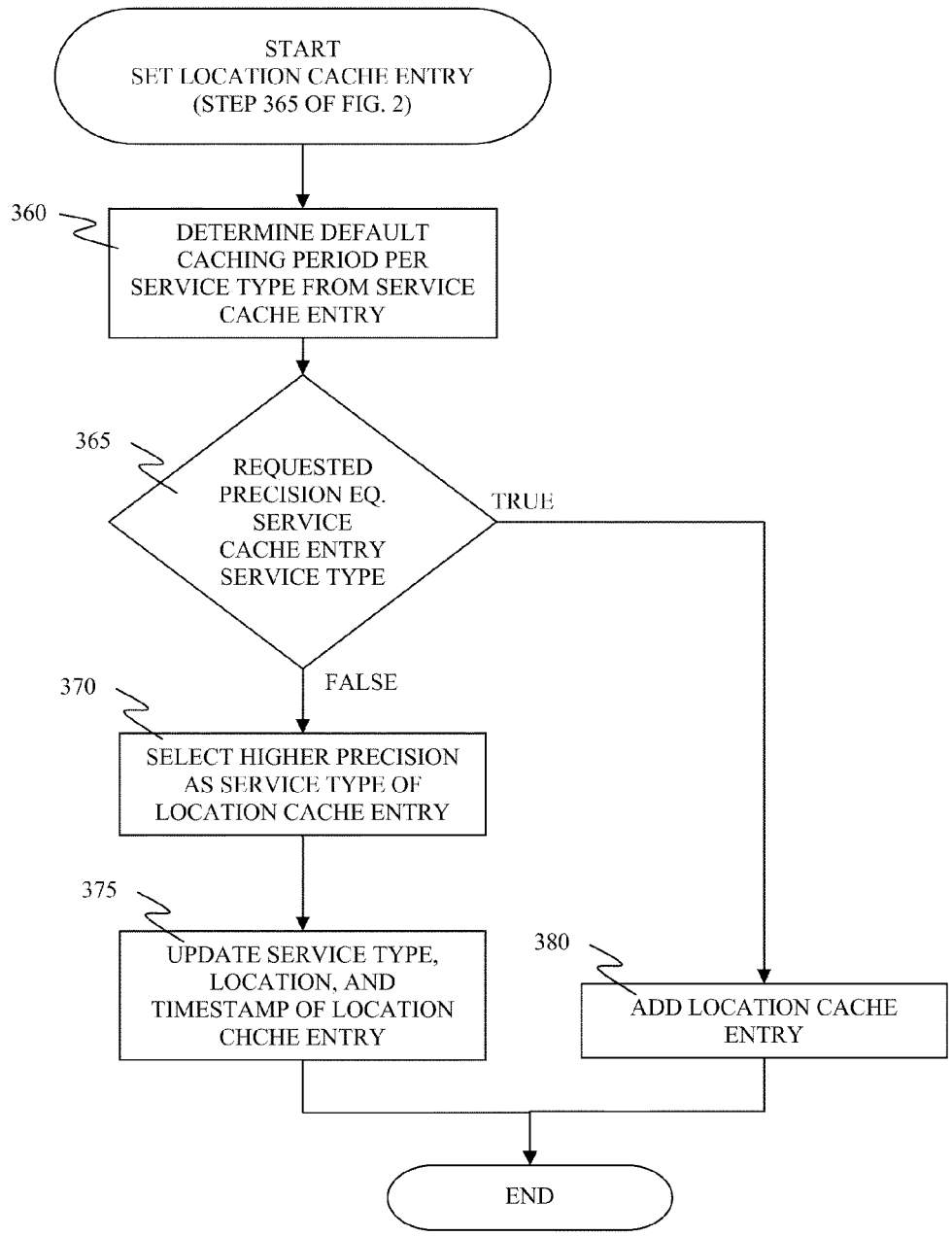
FIG. 5 is a flowchart depicting a method for setting location cache entry to optimize caching period of location data, as performed by a location caching process of the system of FIG. 1, in accordance with the embodiments of the present invention.

FIG. 5 is a flowchart depicting a method for setting location cache entry to optimize caching period of location data, as performed by a location caching process of the system of FIG. 1 supra, in accordance with the embodiments of the present invention.

In step 360, the location caching process determines a default caching period per service precision level from a service cache entry. The service cache entry is identical to the second attribute of the location cache entry CacheDefault, which indicates cache default information comprising the service precision level and the caching period associated with the service precision level, (ServiceType, CachePeriod).

In step 365, the location caching process determines whether the precision level of the location request Precision is equal to the service precision level of the service cache entry ServiceType. If the location caching process determines that the precision level of the location request Precision is not equal to the service precision level of the service cache entry ServiceType, then the location caching process proceeds with step 370. If the location caching process determines that the precision level of the location request Precision is equal to the service precision level of the service cache entry ServiceType, then the location caching process proceeds with step 380.

In step 370, the location caching process selects a higher precision level among the requested precision level Precision and the service precision level ServiceType as the service precision level of the location cache entry ServiceType. Selecting the higher precision level enables the mobile device having the unique identifier MSISDN to concurrently execute multiple location services of various requested precision. Then the location caching process proceeds with step 375.

In step 375, the location caching process updates the location cache entry to set the service precision level ServiceType with the selected service precision level from step 370, the location data PriorLocation with the location data received from step 345 of FIG. 3 supra, the timestamp PriorTimeStamp with the timestamp received from step 345 of FIG. 3 supra, and the caching period CachePeriod with the caching period adjusted in step 350 of FIG. 3 supra. Then the location caching process terminates procession the location request.

In step 380, the location caching process adds a new location cache entry (MSISDN, CacheDefault, PriorLocation, PriorTimeStamp), wherein CacheDefault comprises (ServiceType, CachePeriod), to the location cache with the result received from the real location query in step 345 of FIG. 3 supra. Location data PriorLocation is a latest real location received in response to the real location query. The new location cache entry for MSISDN is created only when the location cache entry was determined to be not available from step 305 of FIG. 3 supra. Then the location caching process terminates procession the location request.

FIGS. 6A, 6B and 6C illustrate examples of default values and rules for optimizing caching period of location data for network based location services, in accordance with the embodiments of the present invention.

FIG. 6A illustrates initial value examples of cache default CacheDefault (ServiceType, CachePeriod) stored in the service cache, which represents a respective service precision level ServiceType and a respective caching period associated with the respective service precision level CachePeriod. FIG. 6A represents a set of cache default, wherein a first caching period associated with the service precision level UNKNOWN is twenty (20) seconds, wherein a second caching period associated with the service precision level HIGH is ten (10) seconds, wherein a third caching period associated with the service precision level MEDIUM is thirty (30) seconds, and wherein a fourth caching period associated with the service precision level LOW is sixty (60) seconds, FIG. 6B illustrates an example of a caching period calculation rule based on the precision level Precision requested by the mobile device and the service precision level ServiceType offered by the network location server. According to the caching period calculation rule of FIG. 6B, if Precision is not known, then the caching period is equal to the default caching period CachePeriod for ServiceType. If Precision is HIGH, then the caching period is reduced by fifty percent (50%) of the default caching period CachePeriod for ServiceType, that is (p'=0.5× CachePeriod). If Precision is MEDIUM, then the caching period is equal to the default caching period CachePeriod for ServiceType, that is (p'=CachePeriod). If Precision is LOW, then the caching period is increased by fifty percent (50%) of the default caching period CachePeriod for ServiceType, that is (p'=1.5× CachePeriod).

FIG. 6C illustrates an example of a rule for adjusting caching period CachePeriod for a respective service precision level ServiceType based on distance that the mobile device had traveled during a time lapse between a prior location request and a current location request. The adjustment of the caching period by traveled distance is applicable only when a real location query was made to the network location server to service the current location request. If the location caching process used a location cache entry to service the current location request, the traveled distance is not accounted in adjusting the caching period. According to FIG. 6C, if a distance (D) is zero (0), then the caching period is not adjusted, that is (p"=p'), wherein p' is an instance of a caching period calculated according to the caching period calculation rule. If the distance (D) is under ten (10) meters, that is 0<D<10, then the caching period is reduced by twenty percent (20%), which results in the adjusted caching period of (p"=0.8×p'). If the distance (D) is under fifty (50) meters, that is 10≦D<50, then the caching period is reduced by thirty five percent (35%), which results in the adjusted caching period of (p"=0.65×p'). If the distance (D) is equal to or greater than fifty (50) meters, that is 50≦D, then the caching period is reduced by fifty percent (50%), which results in the adjusted caching period of (p"=0.5×p').

FIGS. 7A, 7B and 7C illustrate examples of location requests and optimized caching period resulting from the method for optimizing caching period of location data for network based location services of FIG. 3 supra, in accordance with the embodiments of the present invention.

The examples of location requests and the optimized caching period utilize the default values and the rules of FIGS. 6A, 6B, and 6C, supra. As noted in description of FIG. 6C supra when the location data was provided by the network location server in response to the real location query. The caching period calculated by precision requested Precision, that is P', is used only to determine whether or not a real location query should be made to service a current location request, but does not affect the location cache entries. The precision level Precision of the location request is set pursuant to demand of the mobile device and varies for each location request. The location cache entry is set based on how far the mobile device had traveled and which level of precision is proper to service the location request. Regardless of the requested precision level Precision in an individual location request, the location caching process optimizes the caching period in the location cache entry according to the service precision level ServiceType that is necessary to properly service the location request.

FIG. 7A illustrates a first series of three location requests from a mobile device of MSISDN=X for services of high precision level, that is ServiceType=HIGH. According to initial cache default values for ServiceType=HIGH of FIG. 6A supra, a default caching period is ten (10) seconds that is CachePeriod=10.

For a first location request in column 1, a requested precision level is high, that is Precision=HIGH. In step 310 of FIG. 3, supra, the caching period is calculated as five (p'=10× 0.5=5) seconds according to the caching period calculation rule of FIG. 6B, supra. Time lapse of the first location request is six (6) seconds, which is larger than the calculated caching period of five (5) seconds, indicating that the location cache entry of the mobile device of MSISDN=X is determined to be expired in step 330 of FIG. 3, supra. The location caching process consequently sends a real location query to the network location server in step 340 of FIG. 3, supra, and receives new location data from the network location server in step 345 of FIG. 3, supra, as represented in Location Source row of FIG. 7A. In step 350, the location caching process checks traveled distance of the mobile device of MSISDN=X as zero (0) meter. According to FIG. 6C, supra, the location caching process does not adjust the caching period because the mobile device of MSISDN=X did not traveled. The location caching process maintains the default caching period CachePeriod=10 for the services ServiceType=HIGH for the service cache entry. The location caching process subsequently updates the location cache entry for the mobile device of MSISDN=X with the caching period, the new location data and a new timestamp when the real location query is made.

For a second location request in column 2, a requested precision level is low, that is Precision=LOW. In step 310 of FIG. 3, supra, the caching period is calculated as fifteen (p'=10×1.5=15) seconds according to the caching period calculation rule of FIG. 6B, supra. Time lapse of the second location request is three (3) seconds, which is smaller than the calculated caching period of fifteen (15) seconds, indicating that the location cache entry of the mobile device of MSISDN=X is determined to be still effective in step 330 of FIG. 3, supra. The location caching process returns location data of the location cache entry to the mobile device of MSISDN=X in step 350 of FIG. 3, supra. Because the location cache entry for the mobile device of MSISDN=X was effective, the location caching process does not update the location cache entry and does not check traveled distance.

For a third location request in column 3, a requested precision level is high, that is Precision=HIGH. In step 310 of FIG. 3, supra, the caching period is calculated as five (p"=10× 0.5=5) seconds according to the caching period calculation rule of FIG. 6B, supra. Time lapse of the third location request is six (6) seconds, which is larger than the calculated caching period of five (5) seconds, indicating that the location cache entry of the mobile device of MSISDN=X is determined to be expired in step 330 of FIG. 3, supra. The location caching process consequently sends a real location query to the network location server in step 340 of FIG. 3, supra, and receives new location data from the network location server in step 345 of FIG. 3, supra, as represented in Location Source row of FIG. 7A. In step 350, the location caching process checks traveled distance of the mobile device of MSISDN=X as sixty (60) meters. According to FIG. 6C, supra, the location caching process adjusts the caching period by reducing the caching period by fifty percent (50%), that is two and a half seconds (p"=5×0.5=2.5). The location caching process resets the default caching period CachePeriod=2.5 for the services ServiceType=HIGH for the service cache entry. The location caching process subsequently updates the location cache entry for the mobile device of MSISDN=X with the caching period, the new location data and a new timestamp when the real location query is made.

FIG. 7B illustrates a second series of three location requests from a mobile device of MSISDN=Y for services of medium precision level, that is ServiceType=MEDIUM. According to initial cache default values for ServiceType=MEDIUM of FIG. 6A supra, a default caching period is thirty (30) seconds that is CachePeriod=30.

For a fourth location request in column 4, a requested precision level is medium, that is Precision=MEDIUM. In step 310 of FIG. 3, supra, the caching period is calculated as thirty (p'=p=30) seconds according to the caching period calculation rule of FIG. 6B, supra. Time lapse of the fourth location request is forty (40) seconds, which is larger than the calculated caching period of thirty (30) seconds, indicating that the location cache entry of the mobile device of MSISDN=Y is determined to be expired in step 330 of FIG. 3, supra. The location caching process consequently sends a real location query to the network location server in step 340 of FIG. 3, supra, and receives new location data from the network location server in step 345 of FIG. 3, supra, as represented in Location Source row of FIG. 7A. In step 350, the location caching process checks traveled distance of the mobile device of MSISDN=Y as fifty-five (55) meters. According to FIG. 6C, supra, the location caching process adjusts the caching period by reducing the caching period by fifty percent (50%), that is fifteen seconds (p"=30×0.5=15). The location caching process resets the default caching period CachePeriod=15 for the services ServiceType=MEDIUM for a service cache entry. The location caching process subsequently updates the location cache entry for the mobile device of MSISDN=Y with the caching period, the new location data and a new timestamp when the real location query is made.

For a fifth location request in column 5, a requested precision level is low, that is Precision=LOW. In step 310 of FIG. 3, supra, the caching period is calculated as twenty two and a half (p'=p×1.5=22.5) seconds according to the caching period calculation rule of FIG. 6B, supra. The default caching period of the medium service precision level is fifteen (15) seconds, that is CacheDefault (ServiceType, CachePeriod)=(MEDIUM, 15), after the service cache entry update from the fourth location request. Time lapse of the fifth location request is seventeen (17) seconds, which is smaller than the calculated caching period of twenty two and a half (22.5) seconds, indicating that the location cache entry of the mobile device of MSISDN=Y is determined to be still effective in step 330 of FIG. 3, supra. The location caching process returns location data of the location cache entry to the mobile device of MSISDN=Y in step 350 of FIG. 3, supra. Because the location cache entry for the mobile device of MSISDN=Y was effective, the location caching process does not update the location cache entry and does not check traveled distance.

For a sixth location request in column 6, a requested precision level is low, that is Precision=LOW. In step 310 of FIG. 3, supra, the caching period is calculated as twenty two and a half (p'=p×1.5=22.5) seconds according to the caching period calculation rule of FIG. 6B, supra. The default caching period of the medium service precision level is fifteen (15) seconds, that is CacheDefault (ServiceType, CachePeriod)=(MEDIUM, 15), after the service cache entry update from the fourth location request, since the fifth location request did not result in update of the service cache entry. Time lapse of the sixth location request is twenty five (25) seconds, which is larger than the calculated caching period of twenty two and a half (22.5) seconds, indicating that the location cache entry of the mobile device of MSISDN=Y is determined to be expired in step 330 of FIG. 3, supra. The location caching process consequently sends a real location query to the network location server in step 340 of FIG. 3, supra, and receives new location data from the network location server in step 345 of FIG. 3, supra, as represented in Location Source row of FIG. 7A. In step 350, the location caching process checks traveled distance of the mobile device of MSISDN=Y as zero (0) meter. According to FIG. 6C, supra, the location caching process does not adjust the caching period because the mobile device of MSISDN=Y did not traveled. The location caching process restores the default caching period CachePeriod=30 for the services ServiceType=MEDIUM for the service cache entry. The location caching process subsequently updates the location cache entry for the mobile device of MSISDN=Y with the caching period, the new location data and a new timestamp when the real location query is made.

FIG. 7C illustrates a third series of three location requests from a mobile device of MSISDN=Z for services of low precision level, that is ServiceType=LOW. According to initial cache default values for ServiceType=LOW of FIG. 6A supra, a default caching period is sixty (60) seconds that is CachePeriod=60.

For a seventh location request in column 7, a requested precision level is high, that is Precision=HIGH. In step 310 of FIG. 3, supra, the caching period is calculated as thirty (p'=60×0.5=30) seconds according to the caching period calculation rule of FIG. 6B, supra. Time lapse of the seventh location request is twenty five (25) seconds, which is smaller than the calculated caching period of thirty (30) seconds, indicating that the location cache entry of the mobile device of MSISDN=Z is determined to be still effective in step 330 of FIG. 3, supra. The location caching process returns location data of the location cache entry to the mobile device of MSISDN=Z in step 350 of FIG. 3, supra. Because the location cache entry for the mobile device of MSISDN=Z was effective, the location caching process does not update the location cache entry and does not check traveled distance.

For an eighth location request in column 8, a requested precision level is high, that is Precision=HIGH. In step 310 of FIG. 3, supra, the caching period is calculated as thirty (p'=60×0.5=30) seconds according to the caching period calculation rule of FIG. 6B, supra. Time lapse of the eighth location request is thirty three (33) seconds, which is larger than the calculated caching period of thirty (30) seconds, indicating that the location cache entry of the mobile device of MSISDN=Z is determined to be expired in step 330 of FIG. 3, supra. The location caching process consequently sends a real location query to the network location server in step 340 of FIG. 3, supra, and receives new location data from the network location server in step 345 of FIG. 3, supra, as represented in Location Source row of FIG. 7A. In step 350, the location caching process checks traveled distance of the mobile device of MSISDN=Z as eight (8) meters. According to FIG. 6C, supra, the location caching process adjusts the caching period by reducing the caching period by twenty percent (20%), that is forty eight seconds (p"=60×0.8=48). The location caching process resets the default caching period CachePeriod=48 for the services ServiceType=LOW for the service cache entry. The location caching process subsequently updates the location cache entry for the mobile device of MSISDN=Z with the caching period, the new location data and a new timestamp when the real location query is made.

For a ninth location request in column 9, a requested precision level is high, that is Precision=HIGH. In step 310 of FIG. 3, supra, the caching period is calculated as twenty four (p'=48×0.5=24) seconds according to the caching period calculation rule of FIG. 6B, supra. The default caching period of the low service precision level is forty eight (48) seconds, that is CacheDefault (ServiceType, CachePeriod)=(MEDIUM, 15), after the service cache entry update from the eighth location request. Time lapse of the ninth location request is twenty five (25) seconds, which is larger than the calculated caching period of twenty four (24) seconds, indicating that the location cache entry of the mobile device of MSISDN=Z is determined to be expired in step 330 of FIG. 3, supra. The location caching process consequently sends a real location query to the network location server in step 340 of FIG. 3, supra, and receives new location data from the network location server in step 345 of FIG. 3, supra, as represented in Location Source row of FIG. 7A. In step 350, the location caching process checks traveled distance of the mobile device of MSISDN=Z as zero (0) meter. According to FIG. 6C, supra, the location caching process does not adjust the caching period because the mobile device of MSISDN=Z did not traveled. The location caching process restores the default caching period CachePeriod=60 for the services ServiceType=LOW for the service cache entry. The location caching process subsequently updates the location cache entry for the mobile device of MSISDN=Z with the caching period, the new location data and a new timestamp when the real location query is made.

Figure 8:
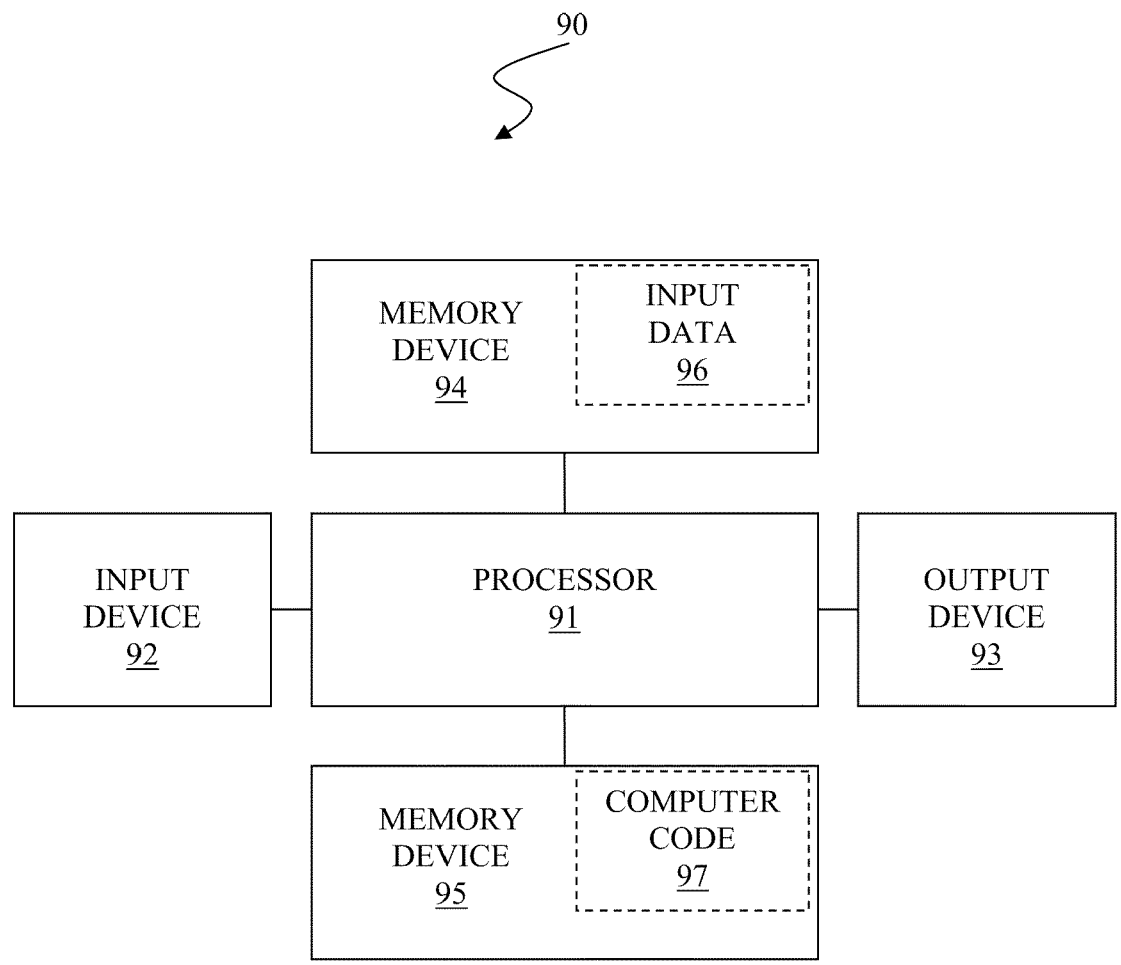
FIG. 8 illustrates a computer system used for optimizing caching period of location data for network based location services, in accordance with the embodiments of the present invention.

FIG. 8 illustrates a computer system used for optimizing caching period of location data for network based location services, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program code that comprises computer-executable instructions. The computer code 97 includes, inter alia, an algorithm used for optimizing caching period of location data for network based location services according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may be used as a computer readable storage medium (or a computer usable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer readable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for optimizing caching period of location data for network based location services.

In another embodiment, the invention provides a business method that performs the process steps of the invention on a subscription, advertising and/or fee basis. That is, a service provider, such as a Solution Integrator, can offer to create, maintain, support, etc. a process for optimizing caching period of location data for network based location services of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing caching period of location data for network based location services performed by a location caching server, said method comprising:

receiving a location request for a location service from a network location server, comprising parameters of MSISDN, Precision, TimeStamp, and ServiceType, wherein MSISDN identifies a mobile device that originates the location request, wherein Precision is a first accuracy of the location data that is requested by MSISDN, wherein the Precision is selected from the group consisting of {HIGH, MEDIUM, UNKNOWN, LOW}, in descending order of the first accuracy, wherein TimeStamp is a first time value when the network location server received the location request, wherein ServiceType is a second accuracy of the location data corresponding to a type of the location service, wherein the second accuracy ServiceType is determined by the network location server independently from the first accuracy Precision, and is selected from the group consisting of {HIGH, MEDIUM=UNKNOWN, LOW}, in descending order of the second accuracy, wherein ServiceType corresponds to a default caching period CachePeriod, and wherein a caching period employed to service the location request is determined pursuant to both CachePeriod and Precision;

determining that current location data of the mobile device needs to be obtained because a location cache coupled to the location caching server does not have a location cache entry accurate enough to service the received location request pursuant to a combination of Precision and ServiceType;

subsequent to said determining, obtaining the current location data from the network location server responsive to sending a real location query to the network location server;

a processor of a computer adjusting the caching period based on a distance that the mobile device has traveled during a time lapse between the first time value TimeStamp and a second time value when the network location server received the real location query from said obtaining, pursuant to the combination of Precision and ServiceType; and setting a new location cache entry to the location cache, the new location cache entry comprising parameters of MSISDN, NewServiceType, NewCachePeriod, PriorLocation, and PriorTimeStamp, wherein NewServiceType is either ServiceType or Precision, wherein NewCachePeriod is the adjusted caching period, wherein PriorLocation is the obtained current location data, and wherein PriorTimeStamp is the second time value.

2. The method of claim 1, said adjusting comprising:

identifying a predefined distance adjustment rule comprising at least one range of distances and a respective ratio associated with each range of said at least one range, the ratio being reversely proportional to a distance covered in said each range such that the location caching server reduces the caching period for the mobile device MsISDN that travels fast;

finding that the distance falls in a first range of distances of said at least one range of distances; and assigning the caching period with a value resulting from multiplying the ratio associated with the first range of distances to CachePeriod.

3. The method of claim 1, said setting comprising:

looking up a service cache entry associated with the ServiceType, the service cache entry comprising parameters of DefaultServiceType, and DefaultCachePeriod;

determining that DefaultServiceType of the service cache entry is not identical to Precision of the location request;

selecting a higher value between DefaultServiceType and Precision as NewServiceType of the new location cache entry such that the new location cache entry satisfies both the first accuracy request by the mobile device and the second accuracy corresponding to the type of the location service; and updating NewServiceType of the new location cache entry with the selected higher value.

4. The method of claim 1, said determining comprising:

discovering that the location cache entry is stored in the location cache, the location cache entry comprising parameters of MSISDN, ServiceType, CachePeriod, PriorLocation, and PriorTimeStamp, wherein PriorLocation is a latest location data, and wherein PriorTimeStamp is a third time value when the latest location data was requested to the network location server;

calculating the caching period from the first accuracy Precision of the location request and the second accuracy ServiceType of the discovered location cache entry according to a predefined caching period calculation rule; and determining that PriorLocation of the discovered location cache entry cannot service the location request from the mobile device by determining that the calculated caching period has expired from the calculated caching period, TimeStamp of the location request, and PriorTimeStamp of the discovered location cache.

5. The method of claim 4, said calculating comprising:

determining that Precision and ServiceType are not identical, wherein the predefined caching period calculation rule comprises all values available for Precision and a factor respectively associated with said all values of Precision, the respective factor being reversely proportional to each value of Precision such that the caching period is reduced wherein the mobile device requests higher accuracy in the location request and such that the caching period is increased wherein the mobile device requests lower accuracy in the location request; and reassigning CachePeriod corresponding to ServiceType with a value resulting from multiplying a first factor associated with Precision.

6. A computer program product comprising:

a computer readable storage device having a computer readable program code embodied therein, said computer readable program code containing instructions that perform optimizing caching period of location data for network based location services performed by a location caching server, said optimizing comprising:

receiving a location request for a location service from a network location server, comprising parameters of MSISDN, Precision, TimeStamp, and ServiceType, wherein MSISDN identifies a mobile device that originates the location request, wherein Precision is a first accuracy of the location data that is requested by MSISDN, wherein the Precision is selected from the group consisting of {HIGH, MEDIUM, UNKNOWN, LOW}, in descending order of the first accuracy, wherein TimeStamp is a first time value when the network location server received the location request, wherein ServiceType is a second accuracy of the location data corresponding to a type of the location service, wherein the second accuracy ServiceType is determined by the network location server independently from the first accuracy Precision, and is selected from the group consisting of {HIGH, MEDIUM=UNKNOWN, LOW}, in descending order of the second accuracy, wherein ServiceType corresponds to a default caching period CachePeriod, and wherein a caching period employed to service the location request is determined pursuant to both CachePeriod and Precision;

determining that current location data of the mobile device needs to be obtained because a location cache coupled to the location caching server does not have a location cache entry accurate enough to service the received location request pursuant to a combination of Precision and ServiceType;

subsequent to said determining, obtaining the current location data from the network location server responsive to sending a real location query to the network location server;

a processor of a computer adjusting the caching period based on a distance that the mobile device has traveled during a time lapse between the first time value TimeStamp and a second time value when the network location server received the real location query from said obtaining, pursuant to the combination of Precision and ServiceType; and setting a new location cache entry to the location cache, the new location cache entry comprising parameters of MSISDN, NewServiceType, NewCachePeriod, PriorLocation, and PriorTimeStamp, wherein NewServiceType is either ServiceType or Precision, wherein NewCachePeriod is the adjusted caching period, wherein PriorLocation is the obtained current location data, and wherein PriorTimeStamp is the second time value.

7. The computer program product of claim 6, said adjusting comprising:

identifying a predefined distance adjustment rule comprising at least one range of distances and a respective ratio associated with each range of said at least one range, the ratio being reversely proportional to a distance covered in said each range such that the location caching server reduces the caching period for the mobile device MSISDN that travels fast;

finding that the distance falls in a first range of distances of said at least one range of distances; and assigning the caching period with a value resulting from multiplying the ratio associated with the first range of distances to CachePeriod.

8. The computer program product of claim 6, said setting comprising:

looking up a service cache entry associated with the ServiceType, the service cache entry comprising parameters of DefaultServiceType, and DefaultCachePeriod;

determining that DefaultServiceType of the service cache entry is not identical to Precision of the location request;

selecting a higher value between DefaultServiceType and Precision as NewServiceType of the new location cache entry such that the new location cache entry satisfies both the first accuracy request by the mobile device and the second accuracy corresponding to the type of the location service; and updating NewServiceType of the new location cache entry with the selected higher value.

9. The computer program product of claim 6, said determining comprising:

discovering that the location cache entry is stored in the location cache, the location cache entry comprising parameters of MSISDN, ServiceType, CachePeriod, PriorLocation, and PriorTimeStamp, wherein PriorLocation is a latest location data, and wherein PriorTimeStamp is a third time value when the latest location data was requested to the network location server;

calculating the caching period from the first accuracy Precision of the location request and the second accuracy ServiceType of the discovered location cache entry according to a predefined caching period calculation rule; and determining that PriorLocation of the discovered location cache entry cannot service the location request from the mobile device by determining that the calculated caching period has expired from the calculated caching period, TimeStamp of the location request, and PriorTimeStamp of the discovered location cache.

10. The computer program product of claim 9, said calculating comprising:

determining that Precision and ServiceType are not identical, wherein the predefined caching period calculation rule comprises all values available for Precision and a factor respectively associated with said all values of Precision, the respective factor being reversely proportional to each value of Precision such that the caching period is reduced wherein the mobile device requests higher accuracy in the location request and such that the caching period is increased wherein the mobile device requests lower accuracy in the location request; and reassigning CachePeriod corresponding to ServiceType with a value resulting from multiplying a first factor associated with Precision.

11. A computer system comprising a processor and a computer readable memory unit coupled to the processor, said computer readable memory unit containing instructions that when run by the processor implement a method for optimizing caching period of location data for network based location services performed by a location caching server, said method comprising:

receiving a location request for a location service from a network location server, comprising parameters of MSISDN, Precision, TimeStamp, and ServiceType, wherein MSISDN identifies a mobile device that originates the location request, wherein Precision is a first accuracy of the location data that is requested by MSISDN, wherein the Precision is selected from the group consisting of {HIGH, MEDIUM, UNKNOWN, LOW}, in descending order of the first accuracy, wherein TimeStamp is a first time value when the network location server received the location request, wherein ServiceType is a second accuracy of the location data corresponding to a type of the location service, wherein the second accuracy ServiceType is determined by the network location server independently from the first accuracy Precision, and is selected from the group consisting of {HIGH, MEDIUM=UNKNOWN, LOW}, in descending order of the second accuracy, and wherein ServiceType corresponds to a default caching period CachePeriod, and wherein a caching period employed to service the location request is determined pursuant to both CachePeriod and Precision;

determining that current location data of the mobile device needs to be obtained because a location cache coupled to the location caching server does not have a location cache entry accurate enough to service the received location request pursuant to a combination of Precision and ServiceType;

subsequent to said determining, obtaining the current location data from the network location server responsive to sending a real location query to the network location server;

a processor of a computer adjusting the caching period based on a distance that the mobile device has traveled during a time lapse between the first time value TimeStamp and a second time value when the network location server received the real location query from said obtaining, pursuant to the combination of Precision and ServiceType; and setting a new location cache entry to the location cache, the new location cache entry comprising parameters of MSISDN, NewServiceType, NewCachePeriod, PriorLocation, and PriorTimeStamp, wherein NewServiceType is either ServiceType or Precision, wherein NewCachePeriod is the adjusted caching period, wherein PriorLocation is the obtained current location data, and wherein PriorTimeStamp is the second time value.

12. The computer system of claim 11, said adjusting comprising:

identifying a predefined distance adjustment rule comprising at least one range of distances and a respective ratio associated with each range of said at least one range, the ratio being reversely proportional to a distance covered in said each range such that the location caching server reduces the caching period for the mobile device MSISDN that travels fast;

finding that the distance falls in a first range of distances of said at least one range of distances; and assigning the caching period with a value resulting from multiplying the ratio associated with the first range of distances to CachePeriod.

13. The computer system of claim 11, said setting comprising:

looking up a service cache entry associated with the ServiceType, the service cache entry comprising parameters of DefaultServiceType, and DefaultCachePeriod;

determining that DefaultServiceType of the service cache entry is not identical to Precision of the location request;

selecting a higher value between DefaultServiceType and Precision as NewServiceType of the new location cache entry such that the new location cache entry satisfies both the first accuracy request by the mobile device and the second accuracy corresponding to the type of the location service; and updating NewServiceType of the new location cache entry with the selected higher value.

14. The computer system of claim 11, said determining comprising:

discovering that the location cache entry is stored in the location cache, the location cache entry comprising parameters of MSISDN, ServiceType, CachePeriod, PriorLocation, and PriorTimeStamp, wherein PriorLocation is a latest location data, and wherein PriorTimeStamp is a third time value when the latest location data was requested to the network location server;

calculating the caching period from the first accuracy Precision of the location request and the second accuracy ServiceType of the discovered location cache entry according to a predefined caching period calculation rule; and determining that PriorLocation of the discovered location cache entry cannot service the location request from the mobile device by determining that the calculated caching period has expired from the calculated caching period, TimeStamp of the location request, and PriorTimeStamp of the discovered location cache.

15. The computer system of claim 14, said calculating comprising:

determining that Precision and ServiceType are not identical, wherein the predefined caching period calculation rule comprises all values available for Precision and a factor respectively associated with said all values of Precision, the respective factor being reversely proportional to each value of Precision such that the caching period is reduced wherein the mobile device requests higher accuracy in the location request and such that the caching period is increased wherein the mobile device requests lower accuracy in the location request; and reassigning CachePeriod corresponding to ServiceType with a value resulting from multiplying a first factor associated with Precision.

16. A process for supporting computer infrastructure, said process comprising providing at least one support service for at least one of creating, integrating, hosting, maintaining, and deploying computer-readable code in a computing system, wherein the code in combination with the computing system is capable of performing a method for optimizing caching period of location data for network based location services performed by a location caching server, said method comprising:

receiving a location request for a location service from a network location server, comprising parameters of MSISDN, Precision, TimeStamp, and ServiceType, wherein MSISDN identifies a mobile device that originates the location request, wherein Precision is a first accuracy of the location data that is requested by MSISDN, wherein the Precision is selected from the group consisting of {HIGH, MEDIUM, UNKNOWN, LOW}, in descending order of the first accuracy, wherein TimeStamp is a first time value when the network location server received the location request, wherein ServiceType is a second accuracy of the location data corresponding to a type of the location service, wherein the second accuracy ServiceType is determined by the network location server independently from the first accuracy Precision, and is selected from the group consisting of {HIGH, MEDIUM=UNKNOWN, LOW}, in descending order of the second accuracy, wherein ServiceType corresponds to a default caching period CachePeriod, and wherein a caching period employed to service the location request is determined pursuant to both CachePeriod and Precision;

determining that current location data of the mobile device needs to be obtained because a location cache coupled to the location caching server does not have a location cache entry accurate enough to service the received location request pursuant to a combination of Precision and ServiceType;

subsequent to said determining, obtaining the current location data from the network location server responsive to sending a real location query to the network location server;

a processor of a computer adjusting the caching period based on a distance that the mobile device has traveled during a time lapse between the first time value TimeStamp and a second time value when the network location server received the real location query from said obtaining, pursuant to the combination of Precision and ServiceType; and setting a new location cache entry to the location cache, the new location cache entry comprising parameters of MSISDN, NewServiceType, NewCachePeriod, PriorLocation, and PriorTimeStamp, wherein NewServiceType is either ServiceType or Precision, wherein NewCachePeriod is the adjusted caching period, wherein PriorLocation is the obtained current location data, and wherein PriorTimeStamp is the second time value.

17. The process of claim 16, said adjusting comprising:

identifying a predefined distance adjustment rule comprising at least one range of distances and a respective ratio associated with each range of said at least one range, the ratio being reversely proportional to a distance covered in said each range such that the location caching server reduces the caching period for the mobile device MSISDN that travels fast;

finding that the distance falls in a first range of distances of said at least one range of distances; and assigning the caching period with a value resulting from multiplying the ratio associated with the first range of distances to CachePeriod.

18. The process of claim 16, said setting comprising:

looking up a service cache entry associated with the ServiceType, the service cache entry comprising parameters of Default ServiceType, and DefaultCachePeriod;

determining that Default ServiceType of the service cache entry is not identical to Precision of the location request;

selecting a higher value between Default ServiceType and Precision as NewServiceType of the new location cache entry such that the new location cache entry satisfies both the first accuracy request by the mobile device and the second accuracy corresponding to the type of the location service; and updating NewServiceType of the new location cache entry with the selected higher value.

19. The process of claim 16, said determining comprising:

discovering that the location cache entry is stored in the location cache, the location cache entry comprising parameters of MSISDN, ServiceType, CachePeriod, PriorLocation, and PriorTimeStamp, wherein PriorLocation is a latest location data, and wherein PriorTimeStamp is a third time value when the latest location data was requested to the network location server;

calculating the caching period from the first accuracy Precision of the location request and the second accuracy ServiceType of the discovered location cache entry according to a predefined caching period calculation rule; and determining that PriorLocation of the discovered location cache entry cannot service the location request from the mobile device by determining that the calculated caching period has expired from the calculated caching period, TimeStamp of the location request, and PriorTimeStamp of the discovered location cache.

20. The process of claim 19, said calculating comprising:

determining that Precision and ServiceType are not identical, wherein the predefined caching period calculation rule comprises all values available for Precision and a factor respectively associated with said all values of Precision, the respective factor being reversely proportional to each value of Precision such that the caching period is reduced wherein the mobile device requests higher accuracy in the location request and such that the caching period is increased wherein the mobile device requests lower accuracy in the location request; and reassigning CachePeriod corresponding to ServiceType with a value resulting from multiplying a first factor associated with Precision.

* * * * *